United States Patent [19]

Wysocki

[11] Patent Number: 4,561,587
[45] Date of Patent: Dec. 31, 1985

[54] FRAME MADE FROM PAPERBOARD AND HAVING LOCKABLE CORNERS

[75] Inventor: Lawrence S. Wysocki, Chicago, Ill.

[73] Assignee: Champion International Corporation, Stamford, Conn.

[21] Appl. No.: 674,875

[22] Filed: Nov. 26, 1984

[51] Int. Cl.[4] ............................................. B65D 5/30
[52] U.S. Cl. ...................................... 229/36; 55/501; 55/518; 55/DIG. 31; 55/511; 210/232; 210/495
[58] Field of Search ................. 55/501, 511, 518, 519, 55/DIG. 31; 210/232, 495; 229/36, 35

[56] References Cited

U.S. PATENT DOCUMENTS

| | | | |
|---|---|---|---|
| 973,429 | 10/1910 | Hilliker | 229/35 |
| 3,992,173 | 11/1976 | Wharton | 55/501 |
| 4,305,544 | 12/1981 | Noonan | 229/35 |
| 4,372,763 | 2/1983 | Champlin et al. | 55/501 |

Primary Examiner—Bernard Nozick
Attorney, Agent, or Firm—Evelyn M. Sommer; William W. Jones

[57] ABSTRACT

A frame is made from a one-piece paperboard blank which is formed in a collapsed shipment and storage blank configuration. The collapsed frame can be manually expanded for use. The corners of the expanded frame are locked by locking tabs and locking slots which hold the frame in its expanded state. The frame can be used to hold air filters which are used to filter the air entering a hot air furnace.

2 Claims, 3 Drawing Figures

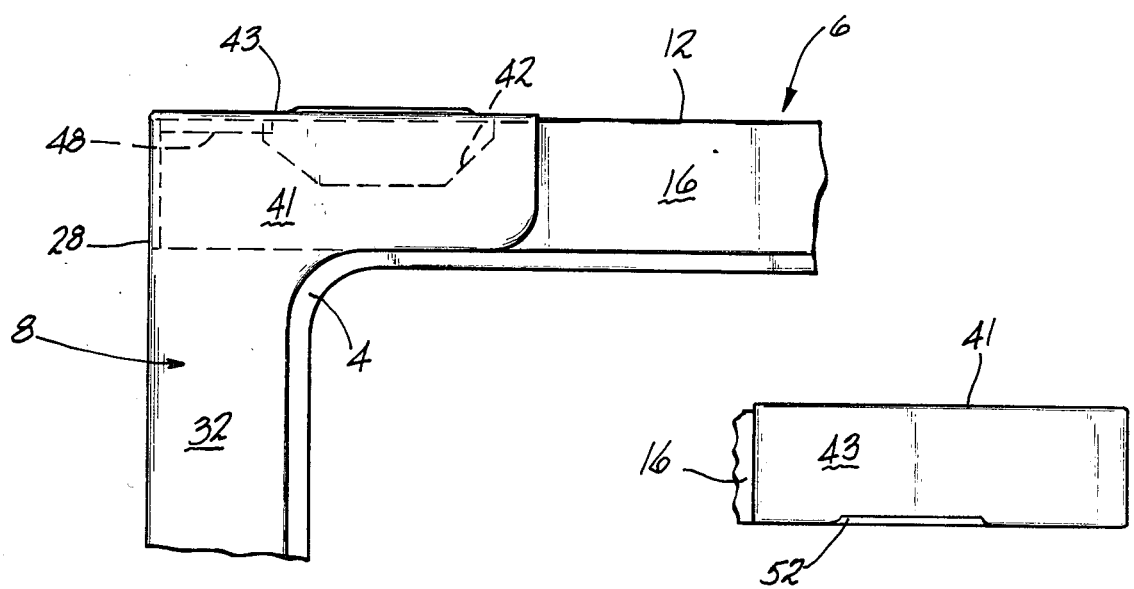

FRAME MADE FROM PAPERBOARD AND HAVING LOCKABLE CORNERS

This invention relates to a frame which is made from a one-piece paperboard blank and which has a collapsed shipping and storage configuration. The frame is manually or machine expandable to an expanded condition, and there are provided locking tabs and locking slots for locking the corners of the expanded frame to prevent collapse thereof. The frame can be used to hold filters of the type designed for filtering the air entering a hot air furnace.

Hot air furnace filters which have paperboard frames are known in the prior art. Such frames are made from one-piece blanks which are folded and glued into a collapsed condition for shipping or storage. The frames are expanded manually to an expanded condition which is suitable for retention in the filter-holding portion of the furnace. These prior art expandable frames rely on profiling of the ends of each side of the frame so that the tendency of the frame to reassume the collapsed condition will push the profiled ends of adjacent frame sides into interlocking engagement at each corner of the frame. With this type of bias interlock, when the expanded frames are handled, often one or more of the corners will accidentally unlock thereby causing the frame and filter to warp. When warped, the filter will not fit properly into the filter holder in the furnace. The unlocking of the corners happens when the expanded frame is squeezed during handling. When this happens, the user may be unaware of the unlocking of the corner or corners and may not understand why the frame and filter has become warped. Likewise, if a warped frame and filter is inserted into the furnace, the filter will not work properly.

This invention relates to an improved frame of the type suitable for use with a furnace filter which can be converted from a shipping and storage flat configuration to a use expanded configuration and which includes locking tabs formed at the corners of the frame which prevent accidental disengagement of the frame corners during handling. Thus the frame and filter will remain in the expanded state when the frame is handled in a normal manner. The locking tabs are preferably contoured for insertion into slots so that accidental withdrawal of the tabs from the slots is prevented.

It is, therefore, an object of this invention to provide a paperboard frame member which can be manually converted from a flat shipping and storage configuration to an expanded use configuration.

It is an additional object of this invention to provide a frame of the character described having provisions to lock the corners of the frame when the latter is converted to the expanded configuration.

It is a further object of this invention to provide a frame of the character described which has locking tabs formed at its corners, which tabs are insertable into slots to secure the frame against accidental collapse from the expanded configuration.

These and other objects and advantages of this invention will become more readily apparent from the following detailed description of a preferred embodiment thereof when taken in conjunction with the accompanying drawings, in which:

FIG. 2 is a fragmented plan view of one corner of the frame formed from the blank of FIG. 1 after the frame has been converted to its expanded form; and FIG. 3 is a fragmented side elevational view of the corner of the erected frame.

Figure 1:
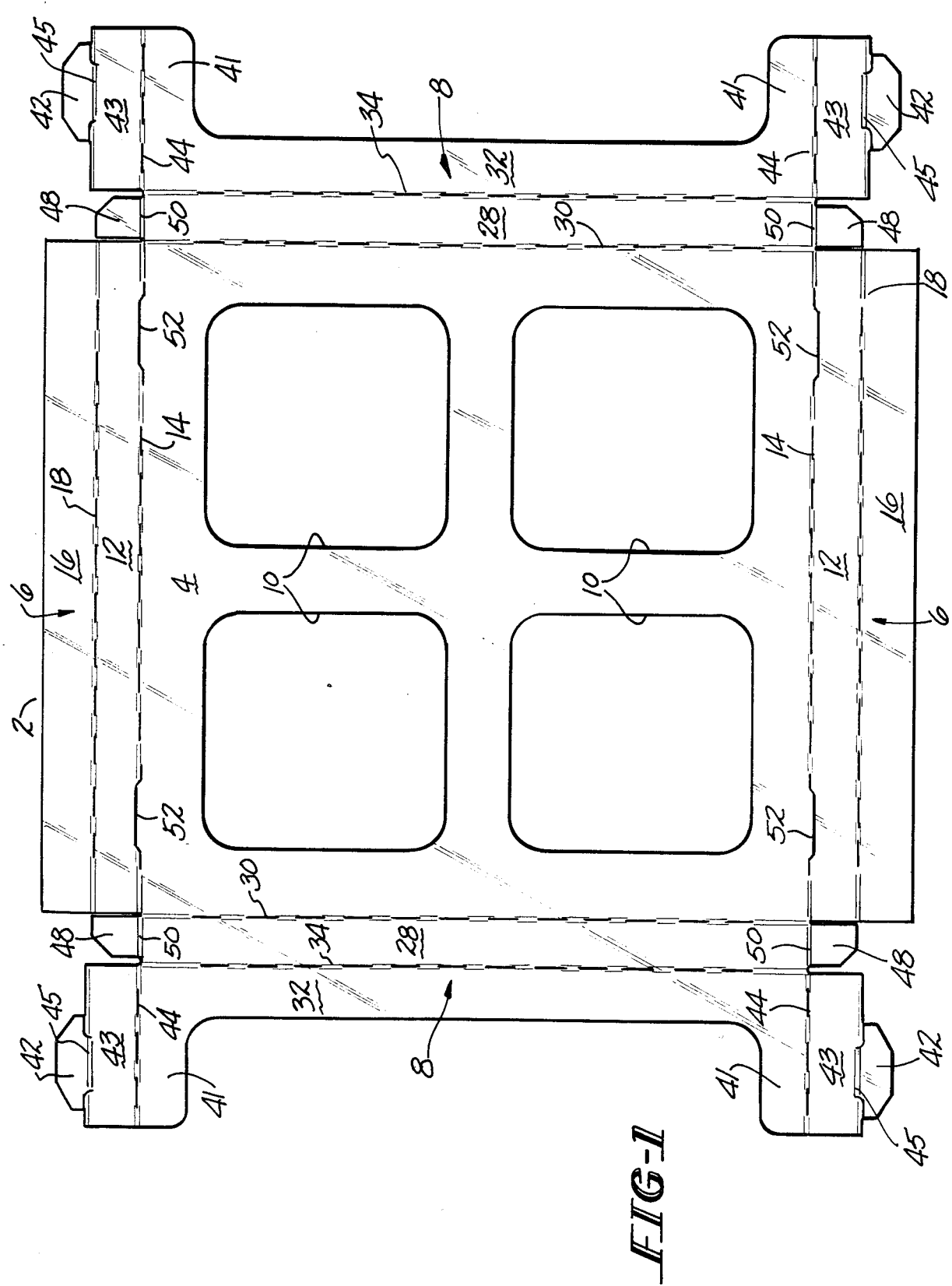
FIG. 1 is a plan view of a preferred embodiment of a cut and scored paperboard blank from which the frame of this invention can be made.

Referring now to FIG. 1, there is shown a cut and scored paperboard blank denoted generally by the numeral 2. The blank 2 includes a back wall panel 4 and opposed sets of framing wall panels 6 and 8. It will be noted that the framing wall panels 6 are of similar construction and are parallel to each other and on opposite sides of the back wall panel 4. Likewise, the framing wall panels 8 are of similar construction and are parallel to each other on opposite sides of the back wall panel 4. The frame which is constructed from the blank 2 shown in FIG. 1 is designed for housing a furnace air filter. For this reason, the back wall panel 4 extends from one side of the blank 2 to the other. It will be understood that other uses for the frame may not require a full back wall panel 4 so that the latter could be a narrow bordering wall. In the furnace filter frame embodiment, the back wall panel 4 is provided with a plurality of holes 10 which allow passage of air through a filter element contained in the frame. Each of the framing panels 6 includes an outer side wall panel 12 connected to the back wall panel 4 along a fold line 14 and a front wall panel 16 connected to the outer side wall panel 12 along a fold line 18. Likewise, each of the framing panels 8 includes an outer side wall panel 28 connected to the back wall panel 4 along a fold line 30 and a front wall panel 32 connected to the outer side wall panel 28 along a fold line 34. Locking tabs 42 are connected to end portions 41 of each of the front wall panels 32 by overlay panels 43 which are connected to the front wall panel portion 41 along fold lines 44. The locking tabs 42 are articulated to the overlay panels 43 along fold lines 45. Corner tuck tabs 48 are connected to the outer side wall panels 28 along fold lines 50. Locking slots 52 are provided along fold lines 14.

Referring to FIG. 2, there is shown in plan view one corner of the frame in its erected condition, all four corners being the same in construction. The framing wall panels 6 are erected first by folding the outer side wall panels 12 about the fold lines 14 to positions perpendicular to the back wall panel 4 and then folding the front wall panels 16 about the fold lines 18 to positions parallel to the back wall panel 4. Then the framing wall panels 8 are erected by folding the tuck tabs 48 about fold lines 50 and then folding the outer side wall panels 28 about the fold lines 30 to positions perpendicular to the back wall panel 4. The tuck tabs 48 thus swing in behind the outer side wall panels 12. The front wall panels 32 are then folded about the fold lines 34 to positions parallel to the back wall panel 4. The end portions 41 of the front wall panels 32 are thus brought down into overlying relationship with the front wall panels 16. The overlay panels 43 are then folded about the fold lines 44 so as to overlie the outer side wall panels 12, and the locking tabs 42 are bent about the fold lines 45 and inserted into the locking slots 52. Each corner is thus erected to complete the frame. FIG. 3 illustrates in elevation one of the corners looking at the overlay tab 43.

It will be readily appreciated that the frame of this invention can be used in a number of different applications, only one of which is as a holder for furnace filters. The frame is readily machine formed to its flattened configuration and can be easily manually converted to its expanded configuration. The corner locks provide the frame with the necessary stability to resist accidental collapse during handling in the expanded configuration.

Since many changes and variations of the disclosed embodiments of the invention may be made without departing from the inventive concept, it is not intended to limit the invention otherwise than as required by the appended claims.

What is claimed is:

1. A frame formed from a one-piece paperboard blank, said frame comprising:
   (a) a back wall panel;
   (b) first and second opposed pairs of framing panels foldably connected to edges of said back wall panel, each framing panel including an outer side wall panel perpendicular to said back wall panel and a front wall panel spaced apart from and parallel to said back wall panel;
   (c) said front wall panels of one of said opposed pairs of framing panels including end portions which project toward each other and are disposed in overlapping relationship with said front wall panels of the other of said opposed pairs of framing panels;
   (d) overlay panels foldably connected to each of said front wall panel end portions, said overlay panels extending toward said back wall panel and being disposed in outwardly overlapping relationship with said outer side wall panels of said other of said opposed pairs of framing panels;
   (e) locking tabs articulated to ends of said overlay panels adjacent edges of said back wall panel; and
   (f) locking slots formed in fold lines interconnecting said outer side wall panels and said back wall panel, said locking tabs extending through said locking slots to lock each corner of said frame in an expanded condition.

2. The frame of claim 1 further comprising tuck tabs foldably connected to each end edge of each of said outer side wall panels of said one opposed pair of framing panels, said tuck tabs being disposed in face-to-face contact with inner end surfaces of each of said outer side wall panels of the other of said opposed pairs of framing panels to reinforce each corner of said frame.

* * * * *